June 14, 1955 P. BORRA 2,710,554
TOOL POST AND HOLDER
Filed Nov. 3, 1952
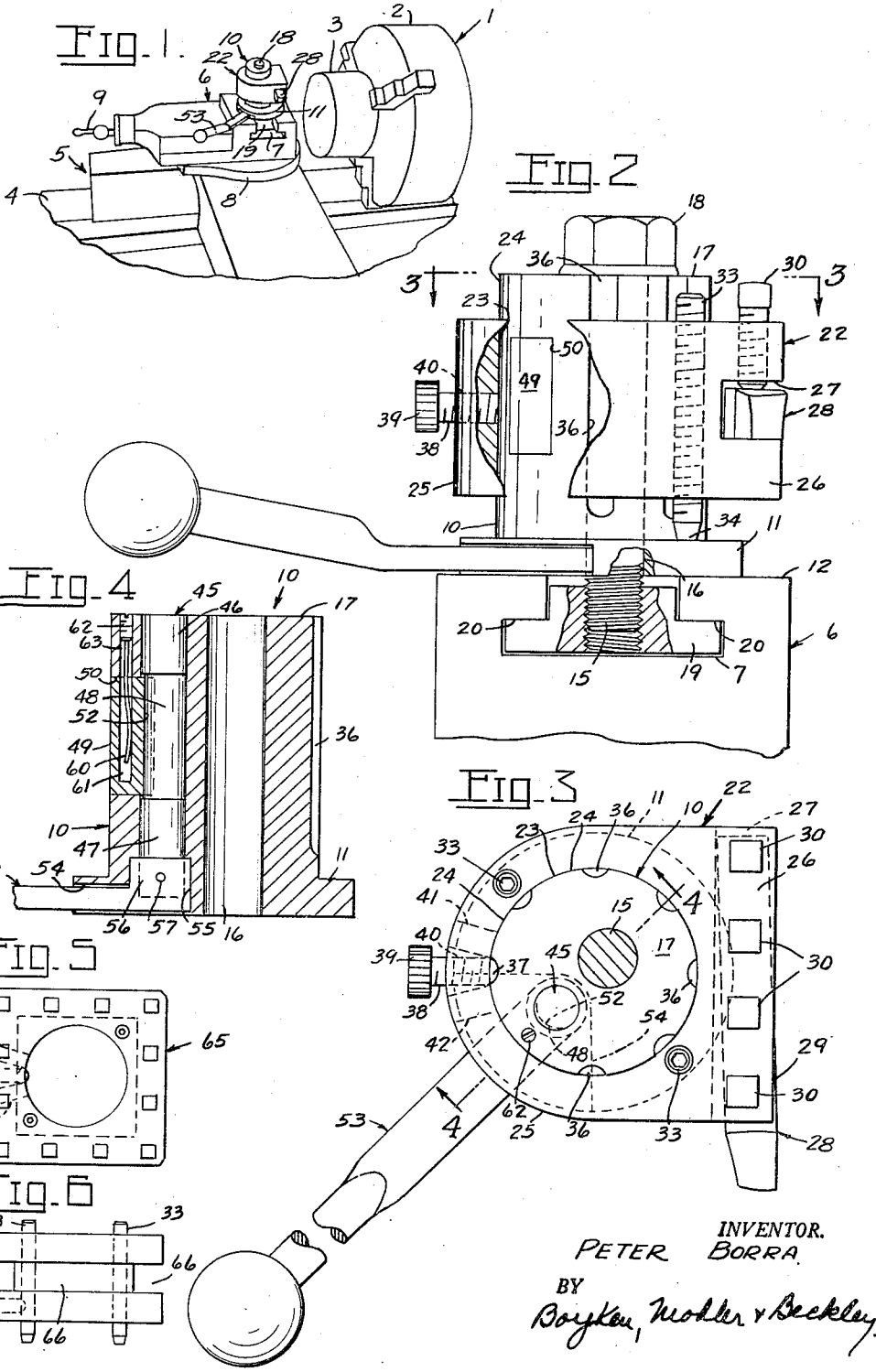
INVENTOR.
PETER BORRA
BY
Boykin, Mohler & Beckley United States Patent Office 2,710,554
Patented June 14, 1955

2,710,554
TOOL POST AND HOLDER
Peter Borra, San Francisco, Calif.
Application November 3, 1952, Serial No. 318,448
2 Claims. (Cl. 82—36)

This invention relates to tool posts and tool holders such as are employed for holding a cutting tool or the like in the desired position on a lathe relative to the work carried by the headstock.

The main object of the present invention is the provision of an improved combination tool post and holder which has greater flexibility in use than heretofore and which permits a greater number of possible tool positions without shifting the compound rest on which the tool post is carried.

Another object of the invention is the provision of an improved tool post which permits the adjustment of the cutting tool more quickly than heretofore and which reduces the possibility of error in setting up the tool in any one position.

Still another object is the provision of a tool post and tool holder assembly permitting more unobstructed working space around the cutting tool than heretofore.

Another object of the invention is the provision of a novel tool post and holder assembly which permits changing the tool to a plurality of predetermined positions relative to the work with great accuracy and without the necessity of changing the angular setting of the compound rest on which the tool post is carried.

Other objects and advantages will be seen from the following specification and from the drawings wherein:

Fig. 1 is a perspective view of the head stock portion of a lathe and showing the invention mounted on a compound rest.

Fig. 2 is a side elevational view of the tool post and holder mounted on a compound rest with portions broken away and in section to show internal structure.

Fig. 3 is a top plan view of the invention as taken along lines 3—3 of Fig. 2.

Fig. 4 is a vertical cross-sectional view through the tool post only as taken along lines 4—4 of Fig. 3.

Fig. 5 is a top plan view a modified form of tool holder and

Fig. 6 is a side elevational view of the tool holder of Fig. 5.

In detail, the invention is adapted to be employed with a conventional engine lathe (Fig. 1) having a headstock generally designated 1 which includes a chuck plate 2 for holding the work such as indicated at 3 (Fig. 1).

Adapted to be moved longitudinally of the lathe bed 4 is the usual carriage generally designated 5 and which has secured thereto a compound rest 6 having ways 7 thereon by which the tool post is secured thereto.

The compound rest 6 is conventionally provided with a base 8 graduated in 180 degrees so that it may be swung in a horizontal plane and operated at any angle. A hand operated crank 9 is provided for moving said base.

When cutting and finishing work rotating on the chuck plate 2 it is frequently necessary to apply the same tool to the work at various angles relative to said work and, more frequently, it is necessary to apply different tools to the work for different operations at different angles. Heretofore the generally adopted practice in such cases has been to mount the first tool at the desired angle by swinging the compound rest 6 to the desired calibration and then, when a change in cutting angle is desired, swinging the compound rest again and setting it with respect to its base at the new angle. A different tool may, or may not, be required for the second cutting operation. This procedure is not only time consuming because great care must be taken to arrive at the correct angles but the possibility of error always exists. The following description of my improved tool post and tool holder will clarify the advantages obtained over the prior art.

As best seen in Figs. 2-4 the invention comprises a substantially cylindrical tool post 10 which is adapted to be mounted vertically on the tool post ways 7 hereinbefore described. The lower end of tool post 10 is enlarged to provide a peripheral flange 11 which is adapted to rest on the upwardly directed surface 12 of the compound rest (Fig. 2).

A bolt 15 is received in an axially extending hole 16 in post 10 with its head 18 bearing on the upper end 17 of tool post 10.

A conventional clamping element 19 is threadedly carried by the lower end of bolt 16 and is adapted to tightly engage the downwardly directed surfaces 20 of ways 7 for clamping tool post 10 to the compound rest. Thus the tool post may be clamped or unclamped relative to the compound rest by simply turning head 18 of bolt 16, which head, it will be noted, provides no interference to the tools or the space adjacent the tool post.

A tool holder generally designated 22 is provided with a through bore 23 in which the outer cylindrical surface 24 of the tool post 10 is adapted to be slidably received. To obtain the requisite accuracy it is necessary that the fit between the surfaces 23, 24 be a good one but this is readily accomplished because both are cylindrical and easily formed. At the same time the tool holder 22 must be sufficiently free on said tool post for axial movement therealong and at the same time be rotatable about the central axis of said post to any angle desired.

The tool holder 22 is preferably in the form of a heavy sleeve having outer cylindrical sidewalls 25 for one half of its circumference and with the other half formed to provide a laterally outwardly projecting, relatively heavy portion 26 which is provided with a horizontally extending laterally outwardly opening channel 27 in which the tool 28 may be received. Such cutting tools generally include an elongated shank 29 which is securely clamped to the tool holder 22 by means of set screws 30 (Figs. 2, 3).

For the purpose of positioning the tool holder at any desired vertical distance from the compound rest 6, screws 33 are provided in vertically extending correspondingly threaded holes in holder 22 so that the points 34 (Fig. 2) of said screw may abut the upwardly facing surface of flange 11. By turning the screws 33, any desired position of holder 22 may be achieved axially of the post 10.

The periphery of post 10 is formed with a plurality of axially extending, circumferentially spaced parallel grooves 36 which are adapted to be engaged by the point 37 of set screw 38 threadedly secured in a hole 40 in the cylindrical walled portion 25 of tool holder 22 for radial movement relative thereto. Said screw 38 is provided with a knurled head 39, so that the same may be manually turned by the operator for moving the same radially toward or away from post 10. The grooves 36 are preferably substantially semi-circular in cross-sectional contour and the point 37 of screw 38 is complementarily rounded so that when the screw 38 is tightened the holder 10 is automatically shifted to a position with the central axis of screw 38 centered on the engaged groove 36.

Although the number of grooves 36 is not critical, as many as seven or eight may conveniently be provided thus providing this number of predetermined positions of tool holder 22 relative to tool post 10. I prefer to space the said grooves 45 degrees so as to provide eight spaces around the tool post 10. However, only seven grooves 45 degrees apart are actually formed and the one space which would otherwise have a groove is employed for the clamping means in a manner which will subsequently be described.

To obtain even more predetermined positions of holder 22 relative to tool post 10 I provide a pair of additional, internally threaded radially extending holes 41, 42 respectively at opposite sides of hole 40. These additional holes 41, 42 are each preferably displaced exactly 15 degrees from hole 40. In this manner, a screw 38 may be transferred to either of the holes 41, 42 to provide 15 degree shifts in the angle of tool 28. The result of this structure is that 24 different positions, 15 degrees apart, are provided for tool 28 without disturbing the setting of the compound rest which is desirable.

It should be noted that the change-over from one position of tool holder 22 relative to tool post may be done quickly and extremely accurately by the above structure. Furthermore the arrangement is fool-proof inasmuch as the predetermined positively defined positions of tool holder 22 prevent mistakes in judgment.

After the proper desired position of the tool holder is set, the next step is to clamp the tool holder and tool post together. The means for so doing will now be described.

Extending longitudinal through the tool post 10 is a shaft generally designated 45 (Figs. 3, 4) which is provided with similar journal portions 46, 47 at the top and bottom ends respectively of said shaft, which journals are rotatably supported in complementarily formed bearings in the tool post 10.

Between said journals 46, 47 the shaft 45 is formed with a substantially cylindrical cam portion 48 eccentric to the axis of journals 46, 47.

Cam portion 48 is adapted to engage a clamping element or lug 49 carried by post 10 and slidable in a complementarily formed slot 50 for radial movement relative to said post. The radially inwardly directed side of clamping lug 49 is formed with an arcuate face 52 which is substantially complementary to the generally cylindrical surface of cam portion 48 by which said face is adapted to be engaged.

By the above described structure, rotation of shaft 45 in one direction will cause clamping lug 49 to be urged radially outwardly into engagement with the wall of bore 23 in holder 22 as shown in Fig. 3. The clamping pressure exerted by lug 49 may be relieved by simply turning shaft 45 in the opposite direction.

To facilitate turning shaft 45 I provide an elongated handle generally designated 53 and rigidly secured at one end to the lower end of shaft 45. To this end the flange 11 which forms a base for post 10 may be relieved as at 54 (Figs. 3, 4) to provide a segment-shaped portion in which the attached end of said handle is swingable. The post 10 may be further relieved to provide a downwardly opening cylindrical recess 55 for receiving a hub 56 integral with arm 53. Hub 56 may be rigidly secured to the lower end of journal 47 in any convenient manner, as by pin 57.

It is important to note that the above structure, wherein handle 53 is mounted at the lower end of tool post 10, achieves the important advantage of getting the handle out of any possible interference with the tools and facilitating the tool changing operation. As seen in Fig. 1, the handle 53 may be swung in a direction away from headstock 1 thus obviating any possible interference.

To prevent the clamping element or lug 49 from jamming against the holder 22 I provide an elongated slightly bowed flat spring 60 which extends downwardly into a vertically opening hole 61 drilled in lug 49 (Fig. 4) and which is adapted to yieldably engage the inner side of said hole 61 which is nearer to the center of the tool post. Spring 60 is rigidly secured at its upper end to a screw 62 threadedly carried in a vertically extending hole 63 in the upper portion of tool post 10 and generally in alignment with hole 61.

Thus the clamping lug 49 is yieldably urged radially inwardly of post 10 at all times and against the cam portion 48 so that when the pressure exerted by said cam portion on lug 49 is relieved, the latter will move radially inwardly out of engagement with holder 22.

To provide adequate space for the cam shaft 45 I prefer to position the tool post clamping bolt 15 at a point offset from the center of said post as best seen in Fig. 3.

The tool holder above described includes only one laterally outwardly opening channel 27 for receiving a cutting tool. Obviously a greater number of tool receiving channels may be provided if desired. For example in Figs. 5 and 6 is shown a modified form of my invention showing a tool holder 65 having four identical tool holding channels 66. In all other respects the holder 65 is the same as holder 22 shown in Figs. 1–3. By providing a plurality of tool holders more than one tool may be secured to the holder for successive operations. However inasmuch as the improved combination of tool post and holder above described greatly facilitates the tool changing operation the device of Figs. 5 and 6 would be desirable only under special circumstances.

The use of the present invention has been found to speed up lathe operations and at the same time promote accuracy.

To mention only one example of the use of the tool, a piece of work 3 held in the clutch plate 2 may be turned on its outside by turning the holder 22 so that the channel 27 is perpendicular to the work, the holder may then be turned at right angles by employing a groove 36 which is spaced 90 degrees from the previously employed groove for use of a boring tool. A chamfer on the end of the bore may then be cut by turning the holder 22 at an angle of 45 degrees (or 15 degrees or 30 degrees) from its previous position. And in addition, without changing the position of the compound rest, a similar chamfer at almost any desired angle may be cut on the outer edge of the work.

The very specific details of the invention herein described are not to be taken as restrictive of the invention as it is obvious that many minor variations in design may be effected without departing from the spirit of the invention as defined in the following claims.

For example, the elongated slightly bowed flat spring 60 hereinbefore referred to may be replaced by a straight length of wire or the like and the hole 61 in lug 49 may be offset to the left (Fig. 4) relative to hole 63 in tool post 10 so that the lug 49 is yieldably urged radially inwardly in the same manner as before. This involves a somewhat simpler construction than described before.

I claim:

1. In a device of the character described, a tool post comprising a substantially cylindrical elongated member adapted to be supported vertically on the compound rest of a lathe, means for clamping said post to said rest for movement with the latter relative to the headstock of said lathe, a tool holder having a vertically extending bore in which said cylinder member is slidably received for axial movement of said holder relative to said member, said holder being swingable about said member in a horizontal plane to different angular positions relative thereto, means on said holder for releasably clamping a tool thereto, said member being provided with a plurality of axially extending grooves on the periphery thereof at circumferentially spaced points therearound, a positioning element on said holder moveable radially of said member into engagement with one of said grooves for adjustably positioning said holder at different angular positions relative to said member and corresponding to said plurality of grooves respectively, a clamping element slidably supported in said member and moveable radially outwardly from an inner position within said member to an outer position in clamping engagement with the bore of said holder, an axially extending shaft rotatably supported in said member and provided with a handle adjacent the lower end of said member and extending generally radially outwardly therefrom for so rotating said shaft, said shaft being formed with an eccentric cam portion for so moving said clamping element upon rotation of said shaft.

2. In a device of the character described, a tool post comprising a substantially cylindrical elongated member adapted to be supported vertically on the compound rest of a lathe, means for clamping said post to said rest for movement with the latter relative to the headstock of said lathe, a tool holder having a vertically extending bore in which said cylinder member is slidably received for axial movement of said holder relative to said member, said holder being swingable about said member in a horizontal plane to different angular positions relative thereto, means on said holder for releasably clamping a tool thereto, said member being provided with a plurality of axially extending grooves on the periphery thereof at circumferentially spaced points therearound, a positioning element on said holder moveable radially of said member into engagement with one of said grooves for adjustably positioning said holder at different angular positions relative to said member and corresponding to said plurality of grooves respectively, a clamping element slidably supported in said member and moveable radially outwardly from an inner position within said member to an outer position in clamping engagement with the bore of said holder, an axially extending shaft rotatably supported in said member and provided with a handle adjacent the lower end of said member and extending generally radially outwardly therefrom for so rotating said shaft, said shaft being formed with an eccentric cam portion for so moving said clamping element upon rotation of said shaft, spring means in said member for yieldably urging said clamping element toward said inner position at all times.

References Cited in the file of this patent
UNITED STATES PATENTS

| | | |
|---|---|---|
| Re. 21,833 | Jackson | June 17, 1941 |
| 480,962 | Richards | Aug. 16, 1892 |
| 496,001 | Richards | Apr. 25, 1893 |
| 1,029,172 | Craig | June 11, 1912 |
| 2,373,535 | Brown | Apr. 10, 1945 |
| 2,428,508 | Weigle | Oct. 7, 1947 |
| 2,615,233 | Ferris | Oct. 28, 1952 |

FOREIGN PATENTS

| | | |
|---|---|---|
| 293,536 | Italy | Feb. 24, 1932 |